(12) United States Patent
Himmelfreundpointner

(10) Patent No.: US 8,864,366 B2
(45) Date of Patent: Oct. 21, 2014

(54) DRUM MIXER

(76) Inventor: Kurt Himmelfreundpointner, Scharten (AT)

( * ) Notice: Subject to any disclaimer, the term of this patent is extended or adjusted under 35 U.S.C. 154(b) by 1925 days.

(21) Appl. No.: 11/995,533

(22) PCT Filed: Jun. 27, 2006

(86) PCT No.: PCT/AT2006/000264
§ 371 (c)(1),
(2), (4) Date: Jan. 12, 2008

(87) PCT Pub. No.: WO2007/022551
PCT Pub. Date: Mar. 1, 2007

(65) Prior Publication Data
US 2010/0080079 A1    Apr. 1, 2010

(30) Foreign Application Priority Data

Jul. 12, 2005 (AT) ................................ GM474/2005

(51) Int. Cl.
| | | |
|---|---|---|
| B01F 9/02 | (2006.01) | |
| B01F 9/06 | (2006.01) | |
| B01F 15/02 | (2006.01) | |
| B28C 5/42 | (2006.01) | |
| B60P 3/16 | (2006.01) | |
| B28C 7/16 | (2006.01) | |
| B01F 9/00 | (2006.01) | |

(52) U.S. Cl.
CPC ........... *B01F 9/0009* (2013.01); *B01F 15/0266* (2013.01); *B28C 5/4258* (2013.01); *B01F 2009/0063* (2013.01); *B60P 3/16* (2013.01); *B01F 15/0251* (2013.01); *B01F 15/0283* (2013.01); *B01F 9/06* (2013.01); *B28C 7/163* (2013.01); *B01F 15/0288* (2013.01)
USPC ............ 366/187; 366/220; 366/232; 366/233

(58) Field of Classification Search
CPC .............. B01F 9/02; B01F 9/025; B01F 9/06; B01F 15/0266; B01F 15/0282
USPC ............. 366/46, 51, 131, 135, 191, 194, 195, 366/196, 40, 62, 63, 232, 233, 170.1, 175.3, 366/187, 188; 34/124, 125
See application file for complete search history.

(56) References Cited

U.S. PATENT DOCUMENTS

| | | | |
|---|---|---|---|
| 1,801,162 A | | 4/1931 | Jaeger |
| 1,922,700 A | * | 8/1933 | Knowles .......................... 366/34 |

(Continued)

FOREIGN PATENT DOCUMENTS

| | | |
|---|---|---|
| DE | 3006690 A1 | 8/1981 |
| DE | 3331314 A1 | 10/1985 |

(Continued)

*Primary Examiner* — William H Beisner
(74) *Attorney, Agent, or Firm* — Brooks Kushman P.C.

(57) ABSTRACT

The invention relates to a drum mixer wherein a drum containing a mixable product and rotatably mounted on a frame and a drive for rotating the drum about the axis of rotation thereof, wherein the mixer is provided with an extraction line which receives the mixable product from the drum by the extracting opening thereof through the front filling opening of the drum. The aim of the invention is to provide an advantageous structural design. For this purpose, the invention provides for a support connected to the frame to which the extraction line, which is projected in the mixable product of the drum is fixed, preferably rigidly, in such a way that forces are removed at least partially.

20 Claims, 1 Drawing Sheet

(56) References Cited

U.S. PATENT DOCUMENTS

| | | | | |
|---|---|---|---|---|
| 1,953,525 | A | * | 4/1934 | Young .............................. 34/125 |
| 2,599,825 | A | * | 6/1952 | Gustafson ..................... 366/187 |
| 2,919,808 | A | * | 1/1960 | Hilkemeier ................... 210/523 |
| 2,945,747 | A | * | 7/1960 | Nielsson ....................... 422/209 |
| 4,192,745 | A | | 3/1980 | Hood |
| 4,865,457 | A | * | 9/1989 | Strehlow ......................... 366/18 |
| 5,249,860 | A | | 10/1993 | Buschbom et al. |

FOREIGN PATENT DOCUMENTS

| | | |
|---|---|---|
| DE | 3433276 A1 | 3/1986 |
| DE | 255887 A1 | 4/1988 |
| DE | 3800461 A1 | 7/1989 |
| DE | 4303584 A1 | 8/1994 |
| EP | 0084359 A2 | 7/1983 |

* cited by examiner

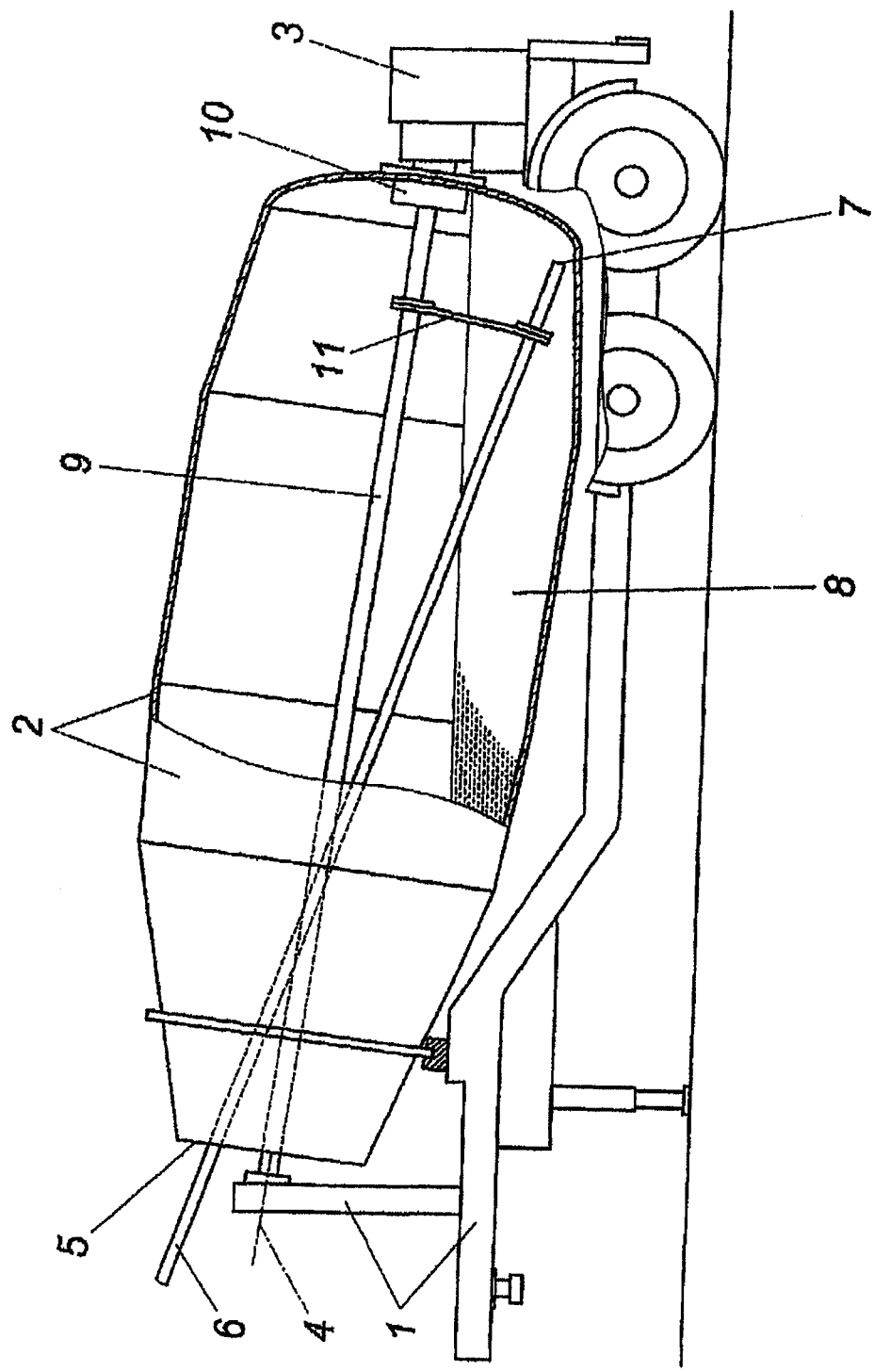

DRUM MIXER

The invention relates to a drum mixer with a drum, which is mounted rotatably on a frame, for a mixing material and with a drive for rotating the drum about its axis of rotation, wherein a removal line is provided, the removal line, extending from a filling opening at the end of the drum, receiving, by means of its removal opening, mixing material from the drum.

In order to be able to remove mixing material from a drum mixer even during the mixing operation, it is known from the prior art (U.S. Pat. No. 5,249,860 A) to supply mixing material to a removal line projecting into the drum, the removal line being upwardly open and having a worm. A disadvantage of devices of this type is that the drum is divided into mixing chambers by the mixing elements, since the mixing elements on the side wall of the drum have to convey mixing material to the removal line, and therefore uniform and thorough mixing of the mixing material cannot be ensured, which, in particular, rules out the use of drum mixers of this type for mixing material which is difficult to mix. Another disadvantage is that the mixing elements with their additional properties for conveying mixing material have to be of comparatively robust design, which requires a high structural outlay.

It is therefore the object of the invention to design a drum mixer of the type outlined at the beginning in a simple structural manner such that removal of uniformly and thoroughly mixed mixing material can be ensured even if the mixing material is difficult to mix.

The invention achieves the object set in that a support is provided, the support being connected to the frame and being connected in a force-removing manner at least in some regions, in particular rigidly, within the drum to the removal line projecting into the mixing material of the drum.

If a support is provided which is connected to the frame and is connected in a force-removing manner at least in some regions within the drum to the removal line projecting into the mixing material of the drum, then, even in the case of high mixing forces on the removal line, sufficient support of the removal line can be ensured. It is therefore also possible for the removal line to be able to project into the mixing material of the drum even during the mixing operation, and therefore, in contrast to the prior art, the drum does not have to be divided into mixing chambers, since mixing elements do not have to be provided for conveying the mixing material. Even mixing material which is difficult to mix can therefore be processed by the drum mixer, which is what makes the drum mixer especially stand out. Furthermore, with the omission of mixing elements of robust design, simple structural conditions are provided, and therefore the mixer according to the invention can be produced particularly cost-effectively.

Simple structural conditions arise if the tubular support which runs essentially along the axis of rotation of the drum firstly is connected to the frame and secondly is mounted rotatably on the inside of the drum opposite the filling opening. Mixing forces on the removal line can therefore be removed via the drum, which reduces the structural outlay of the support.

In order to reduce the structural outlay with respect to the strength of the removal line, the removal line can be connected rigidly to the support in the region of the removal opening, and therefore precisely those mixing forces which subject the removal line mechanically to the greatest stress can be removed by the removal line.

If the removal line which sucks up and conveys the mixing material projects with its removal opening into the lower region of the drum, this results in simple structural conditions for being able to empty the drum.

The subject matter of the invention is illustrated by way of example in the drawing using an exemplary embodiment. A partially opened-up side view of the drum mixer according to the invention is shown.

According to the exemplary embodiment illustrated, the drum mixer has a drum 2 which is mounted rotatably on a frame 1, the frame 1 being designed as movable carriage. The drum 2 is connected to a drive 3 which moves the drum 2 about an axis of rotation 4 running at an inclination with respect to the horizontal. A removal line 6 projects into the drum 2, from a filling opening 5 at the end of the drum 2, with its removal opening 7 projecting into the mixing material 8 in order thereby to be able to remove the mixing material 8 from the drum 2. A support 9 runs in the drum 2, the support being connected to the frame 1 and being rigidly connected to the removal line 6 within the drum 2. A support 9 runs in the drum 2, the support being connected to the frame 1 and being rigidly connected to the removal line 6 within the drum 2. It is therefore possible, in contrast to the prior art, for the removal line 6 to be reliably held in the mixing material 8 of the drum 2 without a removal line 6 having high flexural rigidity having to be used. In addition to a reduced structural outlay for the removal line 6, it can thus also be ensured that the removal line 6 can reliably remove uniformly and thoroughly mixed mixing material 8 at widely varying drum speeds because the forces due to the mixing movements of the mixing material 8 are for the most part removed by the support 9.

On the inside of the drum 2 opposite the filling opening 5, one end of the tubular support 9 is inserted rotatably into a drum bearing 10, with, for structural simplicity, the support 9 running within the drum 2 essentially along the axis of rotation 4 of the drum 2. The other end of the tubular support 9 is connected fixedly, in particular welded, to the frame 1.

The removal line 6 is connected in the region of the removal opening 7 rigidly to the support 9, to be precise, the support 9 forms for this a flexurally rigid holding element 11 which is welded to the removal line 6. The removal opening 7 can therefore be held in a precise position in the mixing material 8 of the drum 2. However, it is also conceivable to provide hydraulic adjusting cylinders instead of the holding element 11, which is not illustrated specifically, in order thereby to be able to change the position of the removal line 6 within the drum 2.

The removal line 6 projects by means of its removal opening 7 into the lower region of the drum 2, with it being possible for the removal line 6 to suck up and convey the mixing material 2 either with a pump and/or a worm without having to take the drum speed into consideration for a uniform mixing of the mixing material 8.

The invention claimed is:

1. A drum mixer with a drum, which is mounted rotatably on a frame, for a mixing material and with a drive for rotating the drum about its axis of rotation, wherein a removal line is provided, the removal line, extending from a filling opening at the end of the drum, receiving, by means of its removal opening, mixing material from the drum, characterized in that a support is provided coaxially with the axis of rotation of the drum, the support being connected fixedly to the frame and being rotatably mounted to the drum mixer at an end of the drum mixer opposite the filing opening and being connected in a force-removing manner at least in some regions, in particular rigidly, within the drum to the removal line projecting into the mixing material of the drum.

2. The drum mixer as claimed in claim 1, characterized in that the support which runs essentially along the axis of rotation of the drum firstly is connected to the frame and secondly is mounted rotatably on the inside of the drum opposite the filling opening.

3. The drum mixer as claimed in claim 2 characterized in that the removal line is connected rigidly to the support in the region of the removal opening.

4. The drum mixer as claimed in claim 2, characterized in that the removal line which sucks up and conveys the mixing material projects with its removal opening into the lower region of the drum.

5. The drum mixer as claimed in claim 1, characterized in that the removal line is connected rigidly to the support in the region of the removal opening.

6. The drum mixer as claimed in claim 5, characterized in that the removal line which sucks up and conveys the mixing material projects with its removal opening into the lower region of the drum.

7. The drum mixer as claimed in claim 1, characterized in that the removal line which sucks up and conveys the mixing material projects with its removal opening into the lower region of the drum.

8. The drum mixer as claimed in claim 1, wherein the support is welded to the frame.

9. The drum mixer as claimed in claim 1, wherein the support is welded to the removal line forming a flexurally rigid holding element.

10. The drum mixer as claimed in claim 1, wherein the support is connected to the removal line by at least one hydraulic adjusting cylinder for changing position of the removal line within the drum.

11. A drum mixer comprising:
a frame;
a drum mounted rotatably on the frame, the drum defining a cavity and having an axis of rotation through the cavity;
a removal line disposed in the cavity; and
a tubular support connected to the drum and fixedly connected to the frame, the support disposed entirely along the axis of rotation within the cavity and being rotatably mounted to the drum mixer at an end of the drum mixer opposite the filling opening, the support being fixedly connected within the drum in a force-removing manner at least in some regions to the removal line forming a rigid holding element.

12. The drum mixer as claimed in claim 11, wherein the support and removal line are sufficiently rigid, when connected, to be effective to reduce the structural outlay to reduce the flexural rigidity for the removal line relative to when the support and the removal line are not connected.

13. The drum mixer as claimed in claim 11, wherein the support and removal line are sufficiently rigid, when connected, to be effective to form a uniform mix of a mixing material at at least two selectable drum speeds.

14. The drum mixer as claimed in claim 11, wherein the tubular support is mounted rotatably to the drum.

15. The drum mixer as claimed in claim 11, wherein the removal line is capable of conveying a mixing material in the drum.

16. A drum mixer comprising:
a frame;
a drum connected to the frame, the drum defining a cavity having a removal opening from the cavity;
a tubular support rotatably connected to the drum and fixedly connected to the frame, the support passing through the cavity; and
a removal line disposed in the cavity and connected rigidly to the support within the drum in a force-removing manner at least in some regions.

17. The drum mixer as claimed in claim 16, wherein the removal line is rigidly connected to the support in a force-removing manner when the removal line projects into a mixing material in the drum.

18. The drum mixer as claimed in claim 16, wherein the removal opening can be held in a predetermined position in a mixing material in the drum.

19. The drum mixer as claimed in claim 16, wherein the support is rigidly connected with an adjustable support to the removal line such that the removal line position is capable is changing positions within the cavity.

20. The drum mixer as claimed in claim 16, wherein the support and removal line are sufficiently rigid, when connected, to be effective to reduce the structural outlay to reduce the flexural rigidity for the removal line relative to when the support and the removal line are not connected.

* * * * *

UNITED STATES PATENT AND TRADEMARK OFFICE
CERTIFICATE OF CORRECTION

| | | |
|---|---|---|
| PATENT NO. | : 8,864,366 B2 | Page 1 of 1 |
| APPLICATION NO. | : 11/995533 | |
| DATED | : October 21, 2014 | |
| INVENTOR(S) | : Himmelfreundpointner | |

It is certified that error appears in the above-identified patent and that said Letters Patent is hereby corrected as shown below:

Column 3, Line 18, Claim 7:

After "The drum mixer as claimed in claim" delete "1" and
Insert --3--.

Signed and Sealed this
Twenty-third Day of February, 2016

Michelle K. Lee
*Director of the United States Patent and Trademark Office*